H. E. WHITE.
MOTOR CONTROL SYSTEM.
APPLICATION FILED JUNE 19, 1909.
1,008,625.
Patented Nov. 14, 1911.
2 SHEETS—SHEET 2.
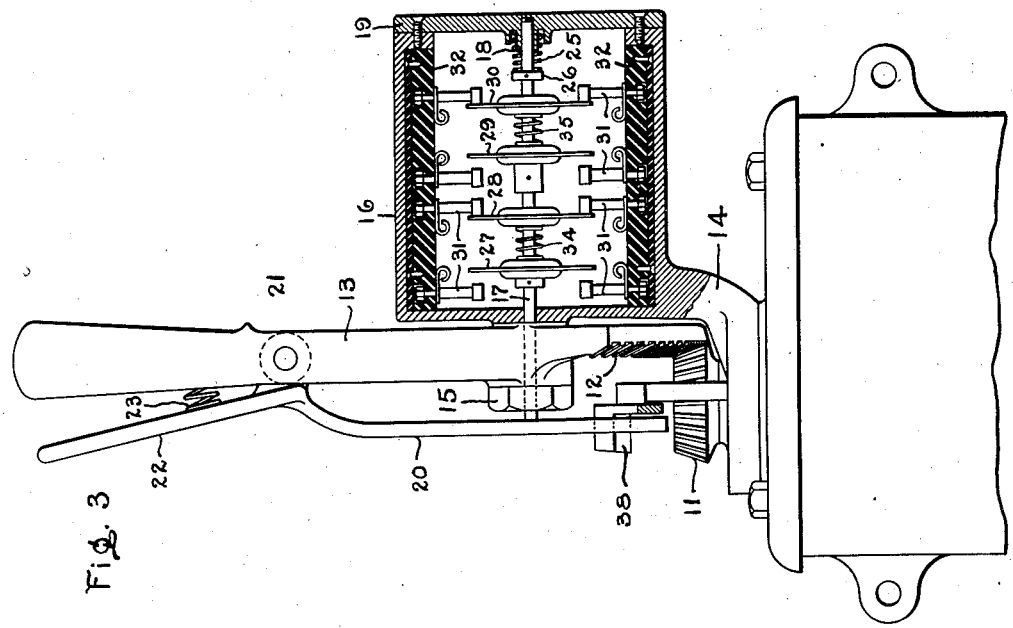
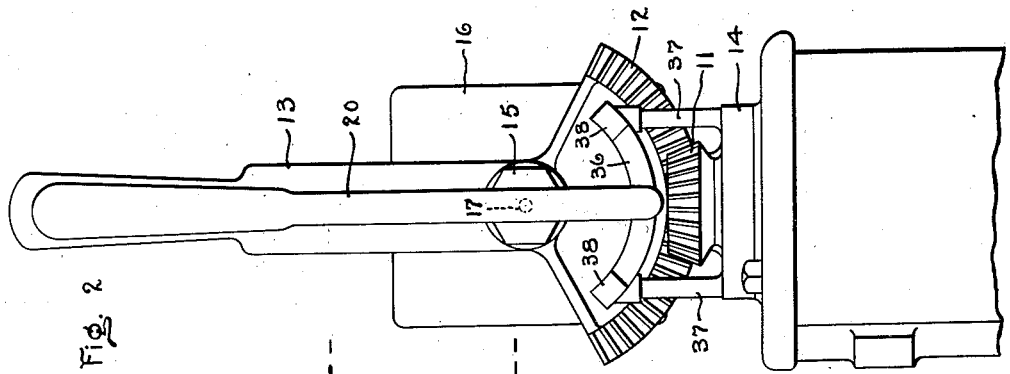
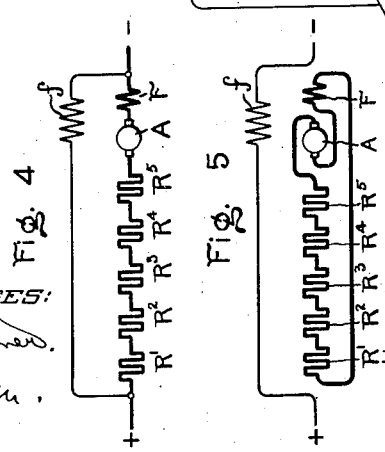
WITNESSES:
INVENTOR
HAROLD E. WHITE.
BY
Albert H. Davis
ATTY.

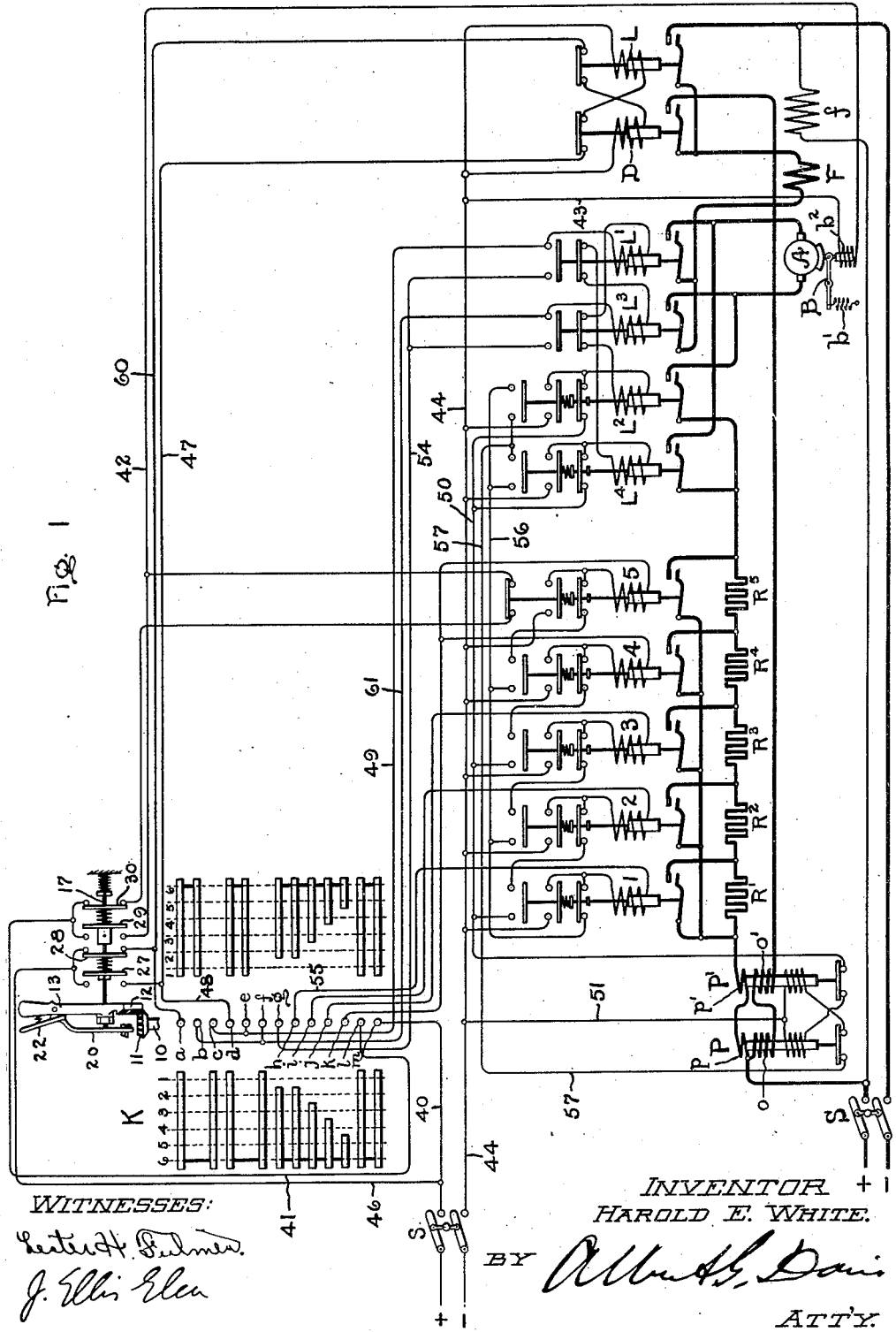

UNITED STATES PATENT OFFICE.

HAROLD E. WHITE, OF SCHENECTADY, NEW YORK, ASSIGNOR TO GENERAL ELECTRIC COMPANY, A CORPORATION OF NEW YORK.

MOTOR-CONTROL SYSTEM.

1,008,625. Specification of Letters Patent. Patented Nov. 14, 1911.

Application filed June 19, 1909. Serial No. 503,058.

*To all whom it may concern:*

Be it known that I, HAROLD E. WHITE, a citizen of the United States, residing at Schenectady, in the county of Schenectady, State of New York, have invented certain new and useful Improvements in Motor-Control Systems, of which the following is a specification.

My invention relates to systems of control for electric motors and particularly to those systems of control in which the motor to be controlled is braked dynamically by connecting it in a closed circuit through more or less resistance.

It is an object of my invention to provide a new and improved system of control of this general type and to this end I provide an arrangement of which the system herein shown and described is an illustrative embodiment.

By my invention the control of the motor both for power and braking operation is effected from a controlling device, which in the same operative positions is easily arranged by the operator for either power or braking control of the motor.

In the particular form of my invention herein set forth I provide a plurality of electrically controlled switches or contactors for connecting the motor to be controlled to a source of current, regulating the amount of resistance in the motor circuit and short-circuiting the motor through resistance for dynamic braking, these contactors being under the control of a master switch provided with means for rendering the master switch operative in the same positions for either power or braking control of the motor. Furthermore, I have shown the motor as provided with a friction brake biased to braking position and released by an electromagnet which is energized at all times during power operation and is energized during dynamic braking, except when all of the resistance is short-circuited in the dynamic braking circuit. The resistance controlling contactors in the system of control shown are arranged in a well-known manner for automatic closing under the control of relays responsive to the current in the motor circuit, these relays being operative during both power operation and dynamic braking of the motor. In connection with these relays, I have introduced a new feature which consists in providing auxiliary series coils energized during dynamic braking, but not during power operation, which, in the particular system hereinafter described, make the "current limit" control of the successive closing of the resistance controlling contactors different during power operation from what it is during dynamic braking operation.

The form and arrangement of the embodiment of my improved system of control shown in this application and its manner of operation will be understood from the following description taken in connection with the accompanying drawings, in which—

Figure 1 is a diagrammatic illustration of a system of control having my invention embodied therein; Fig. 2 is a front elevation of a portion of the master switch showing the handle; Fig. 3 is an elevation at right angles to Fig. 2, certain parts being shown in cross-section; Fig. 4 is a diagram showing the power connections of the motor; and Fig. 5 is a diagram showing the dynamic braking connections of the motor.

Referring to the drawings, the motor to be controlled is shown as of the compound type having an armature A, series field F and shunt field $f$. It will be obvious, however, that my invention is not limited to use in connection with this type of motor. The resistance, interposed in the motor circuit in starting and for purposes of control, is shown as made up of sections $R^1$, $R^2$, $R^3$, $R^4$ and $R^5$ which are, respectively, short-circuited by electrically controlled switches or contactors 1, 2, 3, 4 and 5. The armature is connected in circuit with the resistance and series field for one direction of rotation by the line contactors $L^1$ and $L^2$, and for the other direction of rotation by line contactors $L^3$ and $L^4$. The contactor L connects the motor circuit to the source of current and the contactor D, when closed, short-circuits the motor through the resistance $R^1$ to $R^5$ for dynamic braking; these contactors D and L are interlocked as shown, so that simultaneous closing of them is impossible.

The contactors are controlled from a master switch K, which may be of the drum type, this being shown developed in a well-known conventional manner, as provided with fingers $a$ to $m$ with which segments on the drum coöperate. The master switch is provided with a circuit changing device, which is operated from the handle, these parts being best shown in detail in Figs. 2 and 3. The shaft 10 of the drum of the master switch is provided at its top with a beveled gear 11, with which a beveled gear segment 12 coöperates, the latter being integral with the handle 13 of the master switch, which is mounted on a horizontal axis for movement in a vertical plane. As shown in Figs. 2 and 3, the handle 13 is mounted on a lug which projects from a frame 14 secured to the top of the master switch casing, a nut 15 serving to hold the handle upon the lug. The frame 14 carries, or may have made integral therewith, a box 16, within which the parts of certain circuit changing switches are mounted. In the particular arrangement shown, a rod 17 is arranged for sliding movement within the box 16, one end of the rod being arranged to slide within a boss 18, projecting from the inside of the cover 19, while the other end of the rod projects through the lug upon which the handle 13 is mounted. The outer end of the rod 17 is engaged by lever 20 pivoted at 21 on the handle 13 and extending upwardly into a hand piece 22 adapted to be gripped by the operator. The spring 23 normally biases the lever 20 to the position shown in Figs. 1 and 3, in which said lever forces the rod 17 into the box 16 against the tension of the spring 25 mounted between the inside of the cover 19 and a collar 26 secured on the rod 17. Arranged for free sliding movement on the rod 17 are contact disks 27, 28, 29 and 30, which may be of the well-known form used in connection with the auxiliary switches employed on contactors. These contact disks 27 to 30 coöperate with fixed contact members 31 which may be mounted in insulation 32 on the inside of the box 16. Between the disks 27 and 28 and between the disks 29 and 30 springs 34 and 35 are located, which tend to force the disks of each pair apart into engagement with collars fixed upon the rod 17, as clearly shown in Fig. 3. The arrangement of the disks 27 to 30 and the fixed contact members 31 is such that when the grip 22 is released, and the lever 20 assumes the position shown in Figs. 1 and 3, the disks 28 and 30 bridge their coöperating fixed contacts 31; and when the grip 22 is grasped by the operator, and moved against the tension of the spring 23, thereby moving the lever 20 away from the handle 13 and allowing the rod 17 to slide in response to the pressure of the spring 25, the disks 27 and 29 bridge their coöperating contacts 31. It is, therefore, evident that the circuit changing device is biased to a certain position by the spring 23 and that in order to move said circuit changing device to its other position it is necessary for the operator to press the grip 22 toward the handle 13.

It may be desirable in certain instances to provide a position or positions of the master switch in which it can be left by the operator for power operation of the motor. This can easily be provided for by arranging means operated in certain positions of the controller for holding the lever 20 in the position corresponding to power operation, that is, in the position which it takes when the grip 22 is moved toward the handle. In the particular master switch shown in this application, such means is provided in the full speed position of the controller for either direction of rotation of the motor. From an inspection of the development of the master switch shown in Fig. 1 it will be seen that no change in the control circuits is made by it in the sixth "on" positions from the connections made in the fifth "on" positions. This sixth position is the full speed position, in which the operator may leave the master switch without the necessity of holding the grip 22 against the handle 13 in order to insure power operation. The last mentioned feature is made possible by means of the segment 36 which, as is clearly shown in Figs. 2 and 3, is mounted on supports 37 extending upwardly from the frame 14, lugs 38 being provided on the ends of the segment 36 in such a position that when the handle 13 is turned to its sixth position in either direction and the lever 20 is moved to its outward or power operation position, said lugs 36 will engage the end of the lever 20 and will serve to hold said lever in its outward position. It will, of course, be obvious that, if desired, other lugs 38 may be arranged to coöperate with the lever 20 in other positions of the handle for the same purpose.

The notching relays by which the successive closing of the resistance controlling contactors 1 to 4 is controlled are shown at P and P¹. The manner in which these relays P and P' coöperate with the resistance controlling contactors is that set forth in a co-pending application in the name of Archibald S. Cubitt, Serial No. 431,442, filed May 7, 1908, and assigned to the same assignee as this application. In the system herein shown, the relays P and P¹ are provided with main series coils $p$ and $p^1$, respectively, and with auxiliary series coils $o$ and $o^1$. During power operation the coils $p$ and $p^1$ only are energized, while during dynamic braking the motor current passes through the auxiliary series coils $o$ and $o^1$ as well as the main series coils $p$ and $p^1$, these coils being so wound that the fields produced by them assist one another. With two series coils on each relay arranged in this way, the current in the motor circuit during power operation will be allowed to rise to a higher value than during dynamic braking operation, which under some conditions is desirable, owing to the fact that the mechanical friction of the motor and driven parts has to be overcome during power operation, while during dynamic braking this friction helps to retard the motor. Under some conditions, however, it may be desirable to have the two series coils on the relays differentially wound in order to vary the effect of these relays under different conditions of motor operation, and it is my intention in this application to cover such arrangements broadly. The motor circuits are shown as supplied with current from a suitable source through a switch S, while the control circuits of the system are supplied with current from a source through the switch $s$. The motor A is, in the particular system herein shown, provided with a friction brake B, illustrated in the usual diagrammatic manner as biased to braking position by a spring $b^1$ and as adapted to be released by the energization of an electromagnet $b^2$.

The contactors L, D, $L^1$, $L^2$, $L^3$, $L^4$, 1, 2, 3, 4 and 5 are shown as provided with auxiliary switches or interlocks which make and break connections in the control circuits. These auxiliary switches are shown in the usual conventional manner as of the disk type, which lends itself readily to diagrammatic illustration. The order in which the auxiliary switches of any contactor open and close when the contactor operates will be clear from the drawing and the description of the operation of the system hereinafter given.

The arrangement of control circuits will best be understood from a description of the operation of the control system which will now be given. The switches S and $s$ being closed and the operator desiring to connect the motor to the source for power operation, let us suppose that the handle has been gripped so as to move the lever 20 outwardly and allow the rod 17 carrying the disk 27 to 30 to move to its left-hand position, or, in other words, to the other position from that shown in Figs. 1 and 3; let us assume, also, that the handle has been moved to bring the drum of the master switch into engagement on the right hand side of the fingers $a$ to $m$ inclusive in the 1st position. Under this condition a circuit is completed from the + side of the source through the switch $s$, wire 40, finger $m$, thence to finger $l$ through the coöperating segments, through wire 41, contact disk 29, wire 42, through the brake magnet $b^2$, wire 43, return wire 44 and switch $s$ to the — side of the source. The brake B is, therefore, released. A circuit is simultaneously completed from the positive side of the source through the wire 46, contact disk 27, wire interlock on the contactor D, actuating coil of the contactor L through the return wire 44 back to the — side of the source. The contactor L, therefore, closes. Another circuit is completed from the contacts controlled by the disk 27 through the wire 48 to finger $d$, thence to finger $e$, through the coöperating segments, then through wire 49, actuating coil of the contactor $L^1$, lower interlock on the contactor $L^3$, actuating coil of the contactor $L^2$, lower interlock on the contactor $L^2$, wire 50, contact of notching relay $P^1$, shunt coil of the notching relay P, wire 51 and the wire 44 to the — side of the source. The contactors $L^1$ and $L^2$, therefore, close and the motor is connected to the source through all of the resistance $R^1$ to $R^5$, as shown in Fig. 4, the main series coils $p$ and $p^1$ of the relays P and $P^1$ being, under this condition, connected in the motor circuit. The switch $L^2$, in closing, closed its middle interlock and opened its lower one, thereby shifting its actuating coil from connection to the wire 50 to connection directly to the return wire 44, thereby rendering the same independent of the notching relays. The contactor $L^1$ in closing opened its lower interlock and closed its upper one; the opening of the lower interlock positively prevents the closing of the contactors $L^3$ and $L^4$ and the closing of the upper interlock connects the wire 49 through the wire 54 to the finger $g$ on the master switch K. Opening of the interlock on the switch L positively prevents the energization of the actuating coil of the contactor D. If the master switch is moved to its 2nd position the fingers $g$ and $h$ are connected by their coöperating segments and the wire 55 leading from the finger $h$ is energized, thereby completing a circuit through the actuating coil of contactor 1, through the lower interlock on this contactor, through wire 56, upper interlock on the contactor $L^2$ which has been closed, wire 57, contacts of the notching relay P, shunt coil of the relay $P^1$, wire 51, wire 44 to the — side of the source. The completion of this circuit will take place only if the current in the series coil $p$ has fallen to the value at which the contacts of the relay P are closed. Closing of the contactor 1 short circuits a section of resistance $R^1$ and thus increases the speed of the motor. The contactor 1 in closing closes its middle interlock, opens its lower one and closes its upper one, thereby shifting its actuating coil from connection with the wire 56 to connection with the wire 44 leading directly to the source, and also connecting the actuating coil of the contactor 2 to the actuating wire 50.

Movement of the master switch through its other positions will result in closing the resistance controlling contactors 2, 3, 4 and 5 under the control of the notching relays P and $P^1$ in the manner set forth in the Cubitt application above referred to. It will, therefore, be understood from the foregoing that it is necessary for the operator to maintain the lever 20 in its outward or power operation position while the master switch is in its first five "on" positions, in order to insure power operation. If, however, he moves the master switch to its sixth position, one of the lugs 38 will coöperate with the lever 20 and positively hold the same in its outward position, thereby allowing the operator to take his hand from the handle of the master switch. If while the master switch is in one of its first five "on" positions the operator releases the handle, the circuit changing device controlled by it will assume the position in which it is indicated in Figs. 1 and 3. This will result in momentarily opening all of the contactors which have closed and in reversing the armature with reference to the series field and connecting the armature and field through all of the resistances in a closed circuit, as indicated in Fig. 5. This is brought about in the following manner: When the master switch handle is released, the lever 20, under the influence of the spring 23, forces the rod 17, carrying the contact disks 27 to 30 inclusive, into the position shown in Fig. 1, thereby moving the disks 27 and 29 out of engagement with their coöperating contacts and moving the disks 28 and 30 into engagement with their coöperating contacts. Thereupon, the wires 47 and 48 are deënergized and the contactors L, L¹ and L² open. At the same time the control circuits for the resistance controlling contactors 1 to 5 are also disconnected from the source. Closing of the circuit through the contact disk 28 of the circuit changing device, however, immediately connects the wire 60 to the source and the actuating coil of the contactor D is energized through the interlock on the contactor L, which has closed. The circuit through the contact disk 28 also supplies current to the finger $a$ of the master switch to which the finger $b$ is connected through coöperating segments; from finger $b$ a wire 61 leads to the actuating coil of the contactor L³, thence through the lower interlock on the contactor L¹, the actuating coil of the contactor L⁴, the lower interlock on the latter to wire 50, the contact of the notching relay P¹, shunt coil of the relay P, wire 51, and wire 44 to the — side of the source. The contactors L³ and L⁴ will, therefore, close and the motor will be connected in the circuit illustrated in Fig. 5 and above referred to. If the master switch is in its 2nd, 3rd, 4th or 5th positions the closing of the resistance controlling contactors 1 to 5 will take place exactly as during power operation of the motor, except that the energization of both the series coils $p\ o$ and $p^1\ o^1$ will keep the motor current at a lower value than under power operation, as explained above. Opening of the circuit through the contact disk 29 and closing of the circuit through the contact disk 30 results merely in shifting the control wire 42 for the magnet $b^2$ of the magnetic brake, from direct connection to the source to connection through the upper interlock on the last resistance controlling contactor 5, which interlock is opened when this contactor is closed. With this arrangement it will be understood that if the master switch is in its 5th position and arranged for dynamic braking the magnetic brake will be applied when all of the resistance in the dynamic braking circuit has been short circuited. The system can be so designed that by the time all of the resistance has been short circuited in the dynamic braking circuit the motor will have come substantially to rest and the magnetic brake will, therefore, have but little more to do than to hold the motor and the driven mechanism at rest.

While I have shown but one particular system in which my invention may be embodied, I do not, of course, intend to limit it either to this particular use or to this particular arrangement, but aim to cover in the appended claims all modifications and forms of my invention which come within the scope thereof.

What I claim as new and desire to secure by Letters Patent of the United States, is—

1. In combination, a motor, a controller for connecting said motor to a source of current to regulate the potential applied to said motor and for short circuiting said motor for dynamic braking, a handle for said controller, and means operative from said handle in various positions for connecting the motor for the dynamic braking effect corresponding to said positions.

2. In combination, a motor, a controller for connecting said motor to a source of current, for regulating the potential applied to said motor and for short-circuiting said motor through more or less resistance for dynamic braking, a handle by which said controller is operated, and means whereby release of the handle in certain "on" positions of the controller will connect the motor for the dynamic braking effect corresponding to that position.

3. In combination, a motor, a controller for connecting said motor to a source of current, for regulating the potential applied to said motor and for short-circuiting said motor through more or less of the controller resistance for dynamic braking, a handle by which said controller is operated, circuit-changing means for rendering the controller operative in the same positions for either power or braking control, and means carried by said handle operatively connected to said circuit-changing means.

4. In combination, a motor, a controller for connecting said motor to a source of current, for regulating the potential applied to said motor and for short-circuiting said motor through more or less resistance for dynamic braking, circuit-changing means coöperating with said controller for rendering it operative in the same positions for either power or braking control, means for biasing said circuit-changing means to its braking position, a handle for said controller, and means coöperating with said handle for moving said circuit-changing means to its power position.

5. In a system of motor control, a motor to be controlled, a controller comprising a plurality of contactors for connecting said motor to a source of current, for regulating the potential applied to said motor and for short-circuiting said motor through more or less resistance for dynamic braking, a master switch for controlling the operation of said contactors, and means coöperating with said master switch for rendering it operative in the same positions for either power or braking control.

6. In a system of motor control, a motor to be controlled, a controller comprising a plurality of contactors for connecting said motor to a source of current, for regulating the potential applied to said motor and for short-circuiting the motor through more or less resistance for dynamic braking, a master switch for controlling the operation of said contactors, circuit-changing means coöperating with said master switch for rendering the latter operative in the same positions for either power or braking control, a handle for said master switch, and means coöperating with said handle for operating said circuit-changing means.

7. In a motor control system, a motor to be controlled, a plurality of contactors arranged for operation in succession to control the potential applied to said motor, electromagnetically operated means responsive to current in the motor circuit for regulating the closing of said contactors, and auxiliary magnetizing coils coöperating with said current responsive means only under certain conditions in the motor circuit for varying the effect of said current responsive means.

8. In a system of motor control, a motor to be controlled, resistance therefor, and a controller comprising a plurality of contactors for connecting said motors to a source of current, for regulating the potential applied to said motor and for short-circuiting the motor through more or less resistance for dynamic braking, notching relays arranged to control the successive closing of the potential controlling contactors, and auxiliary series coils on said relays energized during dynamic braking operation but not during power operation for modifying the effect of said notching relays.

In witness whereof, I have hereunto set my hand this 17th day of June, 1909.

HAROLD E. WHITE.

Witnesses:
BENJAMIN B. HULL,
HELEN ORFORD.